US012663116B2

(12) United States Patent
Penven

(10) Patent No.: US 12,663,116 B2
(45) Date of Patent: Jun. 23, 2026

(54) TANK WITH AN INTEGRAL EQUIPMENT SUPPORT TO WHICH VARIOUS EQUIPMENT UNITS ARE CONNECTED AND METHOD OF MANUFACTURING SAID TANK

(71) Applicant: Airbus Operations SAS, Toulouse (FR)

(72) Inventor: Benoît Penven, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 291 days.

(21) Appl. No.: 18/170,779

(22) Filed: Feb. 17, 2023

(65) Prior Publication Data

US 2023/0265968 A1 Aug. 24, 2023

(30) Foreign Application Priority Data

Feb. 24, 2022 (FR) ....................................... 2201626

(51) Int. Cl.
*F17C 1/02* (2006.01)

(52) U.S. Cl.
CPC .......... *F17C 1/02* (2013.01); *F17C 2203/013* (2013.01); *F17C 2209/22* (2013.01)

(58) Field of Classification Search
CPC ...... F17C 1/00; F17C 1/02; F17C 2201/0104; F17C 2203/011; F17C 2203/013; F17C 2209/22; F17C 2221/012
USPC ............................................ 220/592, 560.04
See application file for complete search history.

(56) References Cited

U.S. PATENT DOCUMENTS 2,379,126 A 6/1945 Welden
3,107,498 A 10/1963 Messer
3,951,362 A * 4/1976 Robinson .............. B64D 37/06 220/560.07

FOREIGN PATENT DOCUMENTS

EP 3875831 A1 9/2021

OTHER PUBLICATIONS

French Search Report dated Oct. 18, 2022; priority document.

* cited by examiner

*Primary Examiner* — Don M Anderson
*Assistant Examiner* — Elizabeth J Volz
(74) *Attorney, Agent, or Firm* — Greer, Burns & Crain, Ltd.

(57) ABSTRACT

A tank including an enclosure including a tubular body and first and second end walls at the ends of the tubular body, a plurality of equipment units positioned in the enclosure, at least one equipment support to which the equipment units are connected positioned in the enclosure and connected to the enclosure and a method of manufacturing this tank. The equipment units are fixed to the equipment support outside the enclosure, which simplifies putting them into place and limits the risks of damage. Moreover, they are all introduced into the enclosure at the same time, which makes it possible to reduce the time to manufacture the tank.

5 Claims, 6 Drawing Sheets

TANK WITH AN INTEGRAL EQUIPMENT SUPPORT TO WHICH VARIOUS EQUIPMENT UNITS ARE CONNECTED AND METHOD OF MANUFACTURING SAID TANK

CROSS-REFERENCES TO RELATED APPLICATIONS

This application claims the benefit of the French patent application No. 2201626 filed on Feb. 24, 2021, the entire disclosures of which are incorporated herein by way of reference.

FIELD OF THE INVENTION

The present invention relates to a tank with an integral equipment support to which various equipment units are connected and to a method of manufacturing said tank.

BACKGROUND OF THE INVENTION

In one embodiment that can be seen in FIG. 1, a hydrogen tank 10 includes an exterior enclosure 12, an interior enclosure 14 positioned inside the exterior enclosure 12 and various equipment units 16, such as pipes, sensors, electrical wires, for example, positioned inside and connected to the interior enclosure 14.

In one configuration, each exterior or interior enclosure 12, 14 includes a tubular body 18.1 closed at its ends by domed end walls 18.2, 18.3.

In one method of manufacture, the tubular body 18.1 and a first end wall 18.2 of the interior enclosure 14 are assembled together. The various equipment units 16 are introduced into the interior enclosure 14 from the open end of the tubular body 18.1 and are connected one after the other to the interior enclosure 14 by supports (at least one support for each equipment unit 16). When all the equipment units 16 have been put into place, the interior enclosure 14 is closed by connecting the second end wall 18.3 to the tubular body 18.1, after which the interior enclosure 14 is positioned in the exterior enclosure 12.

The step of putting the equipment units 16 into place is relatively long and strongly impacts the time to manufacture the tank 10. The interior of the interior enclosure 14 being relatively inaccessible, fixing each equipment unit 16 into the interior enclosure 14 proves difficult for an operative. This difficulty is all the greater for the final equipment units 16 that have to be integrated without damaging the first equipment units 16 already installed.

The present invention aims to remedy some or all of the disadvantages of the prior art.

SUMMARY OF THE INVENTION

To this end, the invention has for an object a tank including at least one enclosure and a plurality of equipment units positioned in the enclosure, the enclosure including a tubular body having open first and second ends and first and second end walls connected to the first and second ends, characterized in that the tank includes at least one equipment support to which are connected the equipment units positioned in the enclosure and connected to the enclosure.

The equipment support not being positioned in an enclosure when fixing the equipment units and being easily accessible, putting the equipment units into place is greatly simplified compared to the prior art and the risks of damaging the equipment units positioned first are limited. The fact that the equipment units can be fixed to the equipment support at the same time as assembling a part of the enclosure and are all introduced into the enclosure at the same time makes it possible to reduce the time to manufacture the tank.

In accordance with another feature, the equipment support has a first end connected to the first end wall of the enclosure by at least one built-in first connection, the equipment support being connected in a rigid manner to the first end wall.

In accordance with another feature, the equipment support has a second end connected to the second end wall of the enclosure by at least one second connection.

In accordance with another feature, the second connection is a sliding and pivoting connection configured to enable the equipment support to move in translation relative to the tubular body and to the second end wall in an introduction direction and to pivot relative to the tubular body and to the second end wall about an axis parallel to the direction of introduction.

In accordance with another feature, the equipment support includes a head at its second end. In a complementary way the second connection includes a nose of cylindrical shape with a rounded end secured to the head and a first housing secured to the second end wall configured to receive the nose and to form with said nose a sliding and pivoting connection.

In accordance with another feature, the equipment support includes at least three longitudinal tubes parallel to one another and connected to one another by reinforcements in such a manner as to form a truss, each longitudinal tube having a first end oriented toward the first end wall and a second end oriented toward the second end wall.

In accordance with another feature, the first connection includes for each longitudinal tube a second housing secured to the first end wall in which the first end of the longitudinal tube can be inserted and a rigid connection connecting the longitudinal tube and the first end wall.

In accordance with another feature, each equipment unit is connected to the equipment support by at least one attachment having a first end connected to the equipment unit, a second end connected to the equipment support and a flexible intermediate zone between the first and second ends.

The invention also has for an object a method of manufacturing a tank characterized in that it includes steps of fixing various equipment units to an equipment support and assembling a tubular body and a second end wall, a step of securing the equipment support to a first end wall, a step of introducing the equipment support into the tubular body, and a step of assembling together the first end wall and the tubular body.

BRIEF DESCRIPTION OF THE DRAWINGS

Other features and advantages will emerge from the following description of the invention given by way of example only with reference to the appended drawings, in which.

DETAILED DESCRIPTION OF THE PREFERRED EMBODIMENTS

Figure 1:
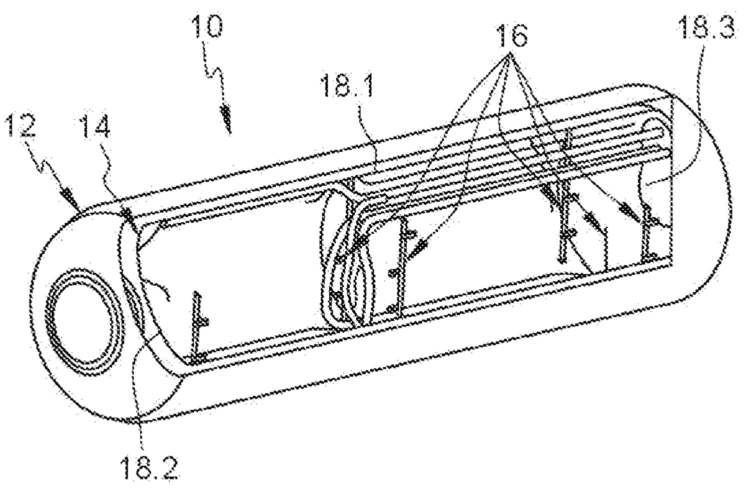
Fig. 1 Prior Art
FIG. 1 illustrates a prior art embodiment is a perspective view of a tank showing as if transparent equipment units positioned inside the tank.

In an embodiment that can be seen in FIGS. 2 and 6A-6C a tank 20 includes at least one enclosure 22. In one application a tank 20 intended for the storage of hydrogen includes two enclosures, an exterior enclosure and an interior enclosure positioned in the exterior enclosure.

The enclosure 22 includes a cylindrical tubular body 24 having open first and second ends 24.1, 24.2 and first and second end walls 26.1, 26.2 closing off the first and second ends 24.1, 24.2 of the tubular body 24. The cylindrical tubular body 24 has an axis of revolution A24.

In one configuration the first and second end walls 26.1, 26.2 each have a hemisphere or dome shape. Each is connected to the tubular body 24 by a peripheral connection 28 such as a weld for example. Of course, the invention is not limited to these shapes of the end walls 26.1, 26.2 or to this peripheral connection 28. Other solutions can be envisaged.

Figure 4:
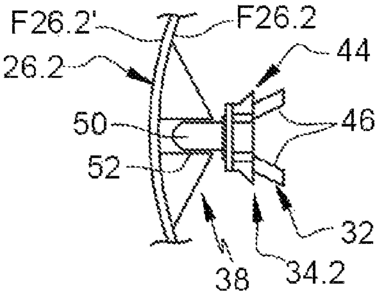
FIG. 4 illustrates an embodiment of the invention is a lateral view of a second connection between the enclosure of a tank and a second end of an equipment support.
Figure 5:
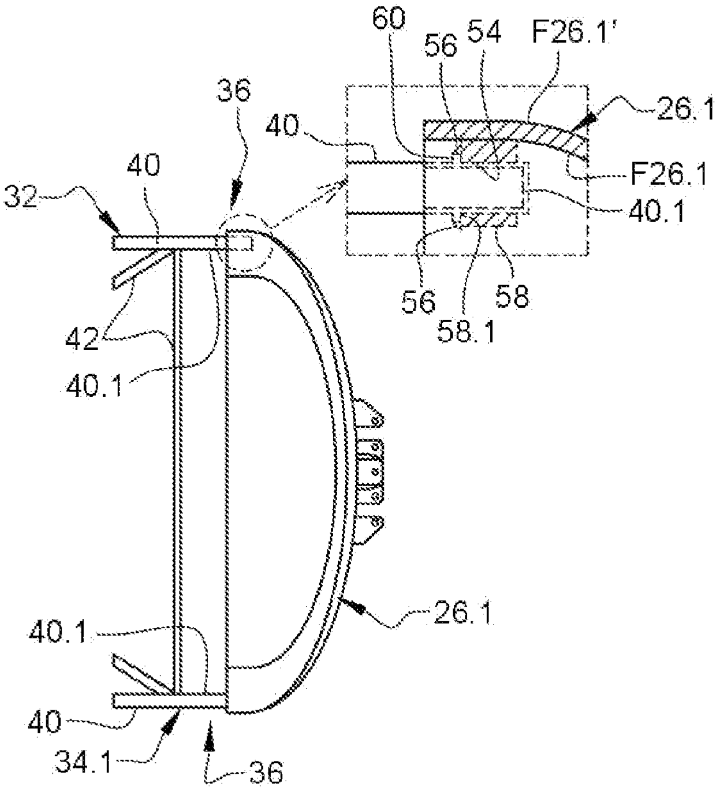
FIG. 5 illustrates an embodiment of the invention is a lateral view of a first connection between the enclosure of a tank and a first end of the equipment support.

As illustrated in FIGS. 4 and 5, each end wall 26.1, 26.2 includes an interior face F26.1, F26.2 oriented toward the interior of the enclosure 22 and an exterior face F26.1', F26.2' opposite the interior face F26.1, F26.2.

The enclosure 22, to be precise its tubular body 24 and its end walls 26.1, 26.2, may be made of metal or composite material.

The tank 20 includes a plurality of equipment units 30, 30', 30" such as pipes 30, sensors 30', electrical wires 30", for example, positioned inside the enclosure 22. This list of equipment units is not exhaustive.

The tank 20 includes an equipment support 32 to which the equipment units 30, 30', 30" are connected, configured to be positioned in the enclosure 22 and connected to the latter by at least one connection.

In one configuration, the equipment support 32 has a first end 34.1 connected to the first end wall 26.1 by at least one first connection 36 and a second end 34.2 connected to the second end wall 26.2 by at least one second connection 38.

Figure 6A:
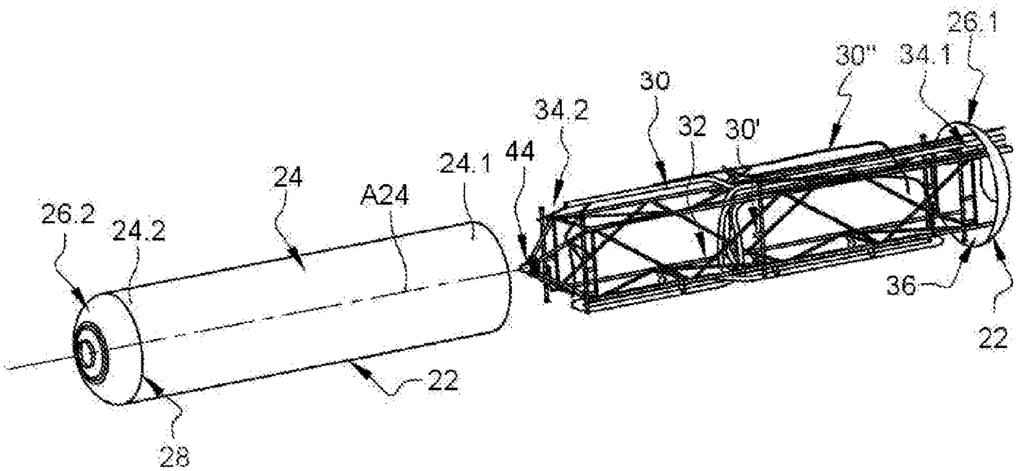
FIGS. 6A-6C illustrate an embodiment of the invention is a set of perspective and lateral views of a tank at various stages of the method of manufacture.
Figure 6B:
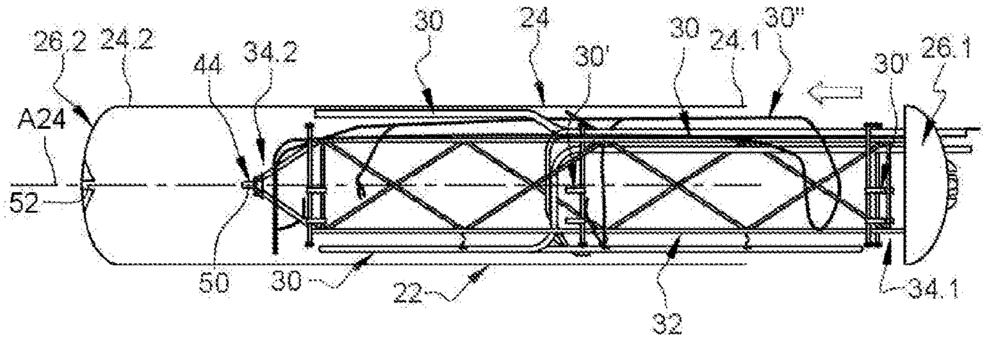
Figure 6C:
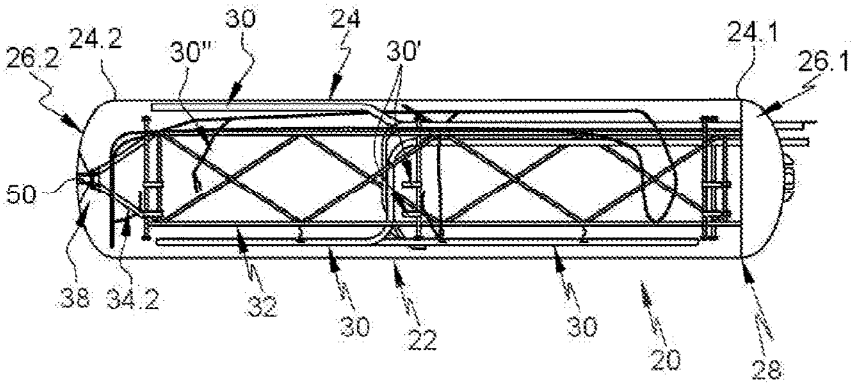

In one arrangement illustrated in FIGS. 6A-6C, during placement of the equipment support 32 the second end wall 26.2 is connected to the tubular body 24 and the equipment support 32 is introduced into the tubular body 24 via its first open end 24.1, the second end 34.2 of the equipment support 32 being introduced first. The equipment support 32 is introduced into the tubular body 24 by movement in translation in an introduction direction parallel to the axis of revolution A24.

In one embodiment, the equipment support 32 includes a welded metal tubular framework. Of course, the invention is not limited to this material for the equipment support 32, which can be made of other materials compatible with the product stored in the enclosure. Likewise, the elements forming the equipment support 32 can be interconnected by any appropriate assembly technique.

In one configuration, the equipment support 32 comprises at least three longitudinal tubes 40 parallel to one another and to the axis of evolution A24 interconnected by reinforcements 42 to form a truss. In one arrangement the equipment support 32 includes four longitudinal tubes 40 disposed at each apex of a quadrilateral in a transverse plane (perpendicular to the axis of revolution A24).

When the equipment support 32 is positioned in the enclosure 22, each longitudinal tube 40 has a first end 40.1 oriented toward the first end wall 26.1 and a second end 40.2 oriented toward the second end wall 26.2.

Figure 3:
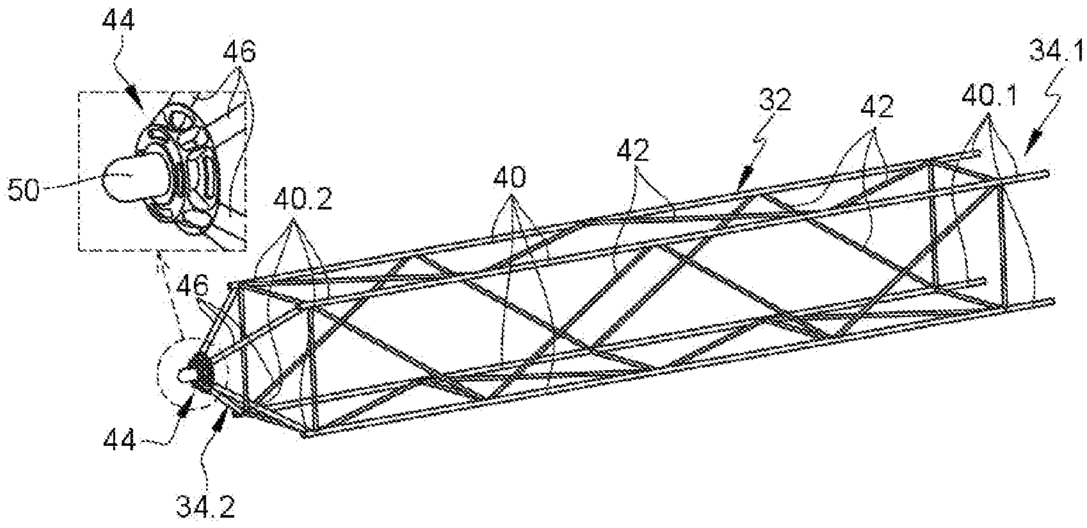
FIG. 3 illustrates an embodiment of the invention is a perspective view of an equipment support.

In an arrangement that can be seen in FIGS. 3 and 4, the equipment support 32 includes at its second end 34.2 a head 44 connected by end tubes 46 to the second ends 40.2 of the longitudinal tubes 40. The head 44 includes at least one ring or disc positioned in a transverse plane.

Figure 2:
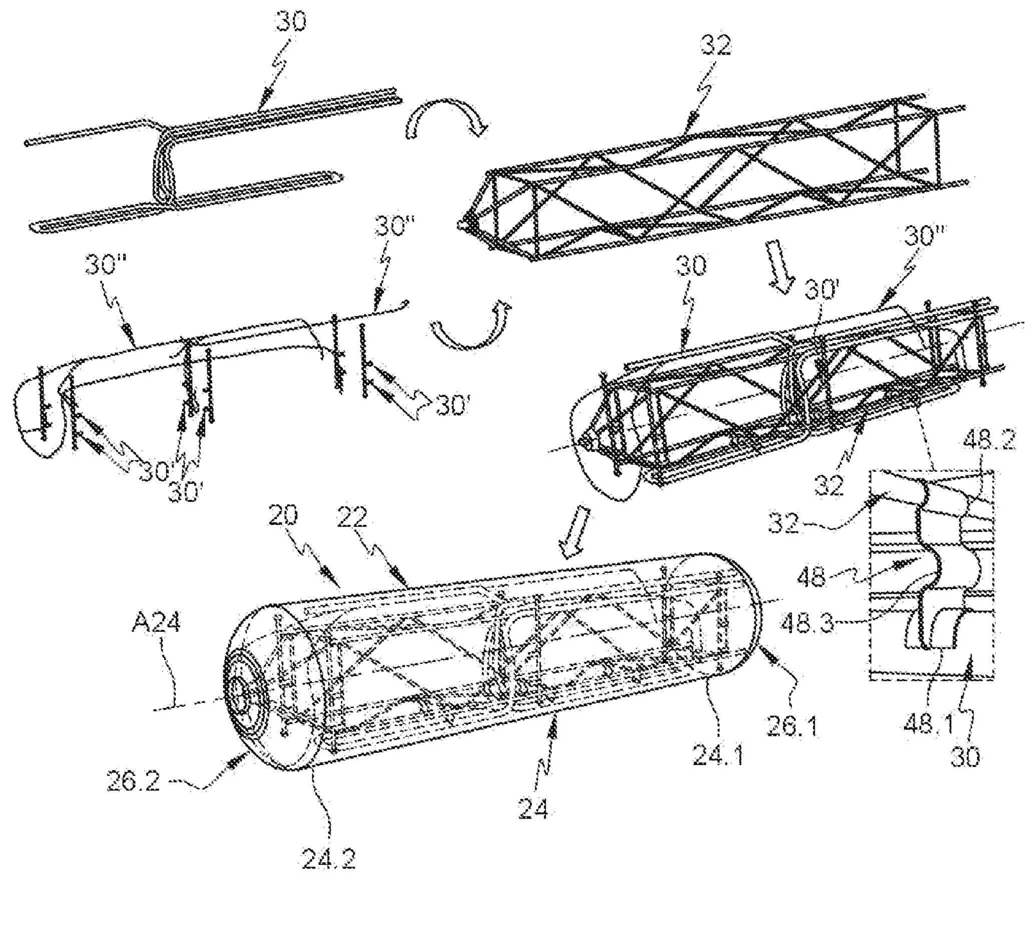
FIG. 2 illustrates an embodiment of the invention is a set of perspective views of the various elements of a tank at various stages of the method of manufacture.

Each equipment unit 30, 30', 30" is connected to the equipment support 32 by at least one attachment 48 that can be seen in FIG. 2 having a first end 48.1 connected to the equipment units 30, 30', 30", for example by means of a weld, and a second end 48.2 connected to the equipment support 32, for example by means of a weld. In one arrangement the attachment 48 includes a flexible intermediate zone 48.3 between the first and second ends 48.1, 48.2. For example, an attachment 48 is a strip of material folded omega-fashion to obtain the flexible intermediate zone 48.3.

In one embodiment the second connection 38 is a sliding and pivoting connection configured to allow the equipment support 32 to move in translation relative to the tubular body 24 and to the second end wall 26.2 in the introduction direction and to pivot relative to the tubular body 24 and to the second end wall 26.2 about an axis parallel to the direction of introduction or to the axis of revolution A24.

In one configuration, the second connection 38 includes a nose 50 of cylindrical shape with a rounded end secured to the head 44 and a first housing 52 secured to the second end wall 26.2, more particularly to its interior face F26.2, and configured to receive the nose 50 and to form with the latter a sliding and pivoting connection.

The first connection 36 is a built-in connection, the equipment support 32 being connected in a rigid manner to the first end wall 26.1. In an embodiment that can be seen in FIG. 5 the first connection 36 includes, for the first end 40.1 of each longitudinal tube 40, a second housing 54 secured to the first end wall 26.1 into which can be inserted the first end 40.1 of the longitudinal tube 40 and a rigid connection 56 connecting the longitudinal tube 40 and the first end wall 26.1. In one arrangement the first end wall 26.1 includes for each longitudinal tube a lug 58 on the interior face F26.1 of the first end wall 26.1 with a hole through it forming the second housing 54 and having a transverse face 58.1 positioned in a transverse plane perpendicular to the axis of revolution A24 and oriented toward the second end wall 26.2. Additionally, each longitudinal tube 40 includes a flange 60 configured to bear against the transverse face 58.1 when the longitudinal tube 40 is inserted in the second housing 54. For example, the rigid connection 56 takes the form of a weld connecting the flange 60 and the transverse face 58.1 and extending over the entire periphery of the flange 60. Of course, the invention is not limited to this embodiment with the built-in first connection 36 connecting the equipment support 32 and the first end wall 26.1.

In a simplified variant, only the first end 34.1 of the equipment support 32 is connected to the first end wall 26.1 by a first built-in connection 36. In this variant the equipment support 32 is connected to the enclosure 22 cantilever fashion. This variant is more particularly suitable for a short equipment support 32 in which the truss structure is sufficiently rigid not to necessitate supporting it at the level of its second end 34.2.

The method of manufacture is described next with reference to FIGS. 2 and 6A-6C.

This method includes steps of fixing the various equipment units 30, 30', 30" to the equipment support 32 illustrated in FIG. 2 and assembling the tubular body 24 and the second end wall 26.2 illustrated in FIG. 6A. The equipment support 32 not being positioned in an enclosure and being easily accessible, fitting the equipment units 30, 30', 30" is greatly simplified compared to the prior art. Moreover, the risks of damaging the equipment units positioned first are limited. The steps of assembling the enclosure 22 and putting the equipment units 30, 30', 30" into place can be carried out simultaneously, which makes it possible to reduce the time to manufacture the tank 20.

The method also includes a step of securing together the equipment support 32 and the first end wall 26.1 illustrated in FIG. 6A followed by a step of introducing the equipment support 32 into the tubular body 24 illustrated in FIG. 6B. Thus, all the equipment units are introduced into the enclosure 22 at the same time, contributing to reducing the time to manufacture the tank 20.

The nose 50 is positioned in the first housing 52 as illustrated in FIG. 6C. Finally, the first end wall 26.1 being brought into contact with the tubular body 24, the method includes a step of assembling together the first end wall 26.1 and the tubular body 24 by connecting them by means of the peripheral connection 28, such as a peripheral weld, for example.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank comprising:

an enclosure, and a plurality of equipment units positioned in the enclosure, the enclosure comprising:

a tubular body having open first and second ends, and first and second end walls connected to the first and second ends, an equipment support to which is connected the plurality of equipment units positioned in the enclosure and connected to the enclosure, wherein the equipment support has a first end connected to the first end wall of the enclosure by at least one built-in first connection, the equipment support being connected in a rigid manner to the first end wall;

wherein the equipment support has a second end connected to the second end wall of the enclosure by at least one second connection; and wherein the second connection is a sliding and pivoting connection configured to enable the equipment support to move in translation relative to the tubular body and to the second end wall in an introduction direction and to pivot relative to the tubular body and to the second end wall about an axis parallel to the direction of introduction.

2. The tank as claimed in claim 1 wherein the equipment support includes a head at its second end and the second connection includes a nose of cylindrical shape with a rounded end secured to the head and a first housing secured to the second end wall configured to receive the nose and to form with said nose a sliding and pivoting connection.

3. The tank as claimed in claim 1 wherein the equipment support includes at least three longitudinal tubes parallel to one another and connected to one another by reinforcements such as to form a truss, each longitudinal tube having a first end oriented toward the first end wall and a second end oriented toward the second end wall.

4. The tank as claimed in claim 3 wherein the first connection includes, for each longitudinal tube, a second housing secured to the first end wall in which the first end of the longitudinal tube is insertable and a rigid connection connecting the longitudinal tube and the first end wall.

5. The tank as claimed in claim 4 wherein each equipment unit is connected to the equipment support by at least one attachment having a first end connected to the equipment unit, a second end connected to the equipment support and a flexible intermediate zone between the first and second ends.

* * * * *